United States Patent
Scobbie

(10) Patent No.: US 8,737,243 B2
(45) Date of Patent: May 27, 2014

(54) METHODS AND APPARATUS FOR MONITORING NETWORK LINK QUALITY

(75) Inventor: Donald MacGregor Scobbie, Juniper Green (GB)

(73) Assignee: Ciqual Limited, Edinburgh (GB)

( * ) Notice: Subject to any disclaimer, the term of this patent is extended or adjusted under 35 U.S.C. 154(b) by 127 days.

(21) Appl. No.: 12/943,088

(22) Filed: Nov. 10, 2010

(65) Prior Publication Data

US 2011/0170433 A1 Jul. 14, 2011

Related U.S. Application Data

(60) Provisional application No. 61/260,958, filed on Nov. 13, 2009.

(30) Foreign Application Priority Data

Nov. 10, 2009 (GB) .................................. 0919655.1

(51) Int. Cl.
*H04L 5/12* (2006.01)
*H04L 12/26* (2006.01)
*H04J 3/14* (2006.01)
*G06F 11/00* (2006.01)

(52) U.S. Cl.
USPC ........... 370/252; 370/235; 370/241; 370/242; 370/229; 709/235

(58) Field of Classification Search
USPC ........................... 370/229–253; 709/224–235
See application file for complete search history.

(56) References Cited

U.S. PATENT DOCUMENTS

| 6,076,113 A * | 6/2000 | Ramanathan et al. ......... 709/235 |
| 7,796,524 B1 * | 9/2010 | O'Connell et al. ........... 370/241 |
| 2003/0133443 A1 | 7/2003 | Klinker et al. |
| 2006/0146703 A1 | 7/2006 | Cha et al. |
| 2008/0159153 A1 * | 7/2008 | Bajpay et al. ................. 370/242 |
| 2009/0161554 A1 | 6/2009 | Agarwal et al. |

OTHER PUBLICATIONS

"HTTP ping" Research Disclosure, International Business Machines Corporation, Mason Publications, Hampshire GB, vol. 463, No. 203, Nov. 1, 2002, 1 page.
International Search Report (2 pgs.) dated Mar. 28, 2011 issued in International Application No. PCT/GB2010/051878.
International Preliminary Report on Patentability and Written Opinion of the International Searching Authority dated May 15, 2012 issued in International Application No. PCT/GB2010/051878 (8 pgs.).

* cited by examiner

*Primary Examiner* — Jung Park
*Assistant Examiner* — Chuong M Nguyen
(74) *Attorney, Agent, or Firm* — Nixon & Vanderhye P.C.

(57) ABSTRACT

Properties of data transmission are measured in a telecommunications network (2) comprising an access network segment (6) and a core network segment (4). A packet switched network endpoint device (10) in communication with the access network segment passively monitors data throughput between the telecommunication network and the endpoint device and conducts active tests of data transmission latency and data transmission loss by exchanging active test data packets with an active test server (8). Test result data is transmitted to the active test server in active test data packets (106, 118), avoiding additional network traffic. Active tests are conducted from the application layer. The resulting metrics accurately represent the experience of users of the endpoint devices.

43 Claims, 3 Drawing Sheets

METHODS AND APPARATUS FOR MONITORING NETWORK LINK QUALITY

FIELD OF THE INVENTION

The invention relates to the field of measuring properties of data transmission to and from packet switched network endpoint devices through packet switched networks including, but not limited to, telecommunications networks which comprise an access network segment and a core network segment and which support the transmission of data packets by internet protocol (IP).

BACKGROUND TO THE INVENTION

In order to ensure and monitor the quality of service provided to end users of packet switched networks, including telecommunication networks, it is important to be able to measure properties of the link provided to endpoint devices (such as mobile telephones, laptop and desktop computers, and so forth) through one or more network interfaces between the respective endpoint device and the packet switched network. For example, it is desirable to measure data throughput, latency and loss, preferably in both the uplink and the downlink.

Many known techniques employ passive monitoring in the access network segment to measure throughput and loss. However, these techniques can be expensive, with costs which scale with packet rate. Furthermore, measurements of quality of service made within the access network segment may differ significantly from the actual quality of service received at endpoint devices.

It is also known to conduct active end-to-end tests in which software and hardware appliances function as endpoint devices, generating network traffic to simulate typical actions of users of the network and recording suitable metrics. However, end-to-end test apparatus can be expensive and cannot be practically employed to measure activity concurrently across more than a small proportion of network coverage. Furthermore, there is again a significant risk that measurements of quality of service made using end-to-end test apparatus differs significantly from the actual quality of service received by users of endpoint devices, or some subsets of users.

It is known to conduct passive tests at endpoint devices, for example, using the technique known as passive packet capture. Path flooding speed tests are also known for measuring link throughput. However, these tests are limited in their scope and generate a substantial amount of network traffic if they are to be reliable.

Accordingly, it is an object of the present invention to provide methods and apparatus for measuring properties of data transmission through packet switched networks to packet switched network endpoint devices, which provide measurements which are an accurate reflection of the quality of service received by users of the endpoint devices.

It is also an object of the present invention to provide methods and apparatus for measuring properties of data transmission through packet switched networks to packet switched network endpoint devices, which can be implemented in a cost-effective fashion without generating excessive network traffic, enabling large scale deployment.

Some embodiments of the invention aim to provide methods and apparatus which can be implemented using software applications which can be installed on endpoint devices, without the requirement for any specific hardware to be introduced into the access network segment.

Some embodiments of the invention aim to provide methods and apparatus which can provide measurements concerning properties of data transmission between endpoint devices and specific interfaces between network segments within a telecommunications network comprising at least one access network segment and at least one core network segment.

SUMMARY OF THE INVENTION

According to a first aspect of the invention there is provided a method of measuring properties of data transmission either or both to and from packet switched network endpoint devices through a packet switched network, the method comprising the steps carried out by a packet switched network endpoint device of passively monitoring data throughput between the packet switched network and the endpoint device and conducting an active test, the active test comprising transmitting active test data packets to and receiving active test data packets from the packet switched network to actively monitor data transmission latency and data transmission loss through the packet switched network.

The combination of passive monitoring of data throughput and active testing to measure data transmission latency and data transmission loss enables accurate measurement of properties of data transmission either or both to and from packet switched network endpoint devices through the packet switched network.

Preferably, the active test is conducted whilst data throughput is passively monitored. Preferably, data throughput (for example, total data throughput) is passively monitored over a period of time and, during that period of time, a plurality of active tests are carried out. Data throughput may be measured by passive monitoring and both data transmission latency and data transmission loss may be monitored by way of active tests in connection with the same endpoint device concurrently.

In more detail, monitoring data throughput may comprise receiving at least one measurement of the total data throughput between the packet switched network and the endpoint device, and may furthermore comprise calculating the difference between measurements of the total data throughput between the packet switched network and the endpoint device during a given time period (for example dividing the difference in total throughput for a given time period by the length of the time period to give an average throughput for that time period).

Typically, the method comprises providing an active test server in electronic communication with the packet switched network for receiving active test data packets from and transmitting active test data packets to the endpoint devices.

The active test server typically also stores active test result data concerning data transmission latency and data transmission loss. The active test server may also receive and store throughput data concerning passively monitored data throughput and associate both active test result data and throughput data with the endpoint device which the data concerns.

Preferably, at least some of the active test result data is calculated by the endpoint device and communicated to the active test server in an active test data packet. The active test result data may concern whether or not previous active test data packets were received, or periods of time between stages of an active test.

Thus, some or all of the active test result data which is transmitted from the endpoint device across the packet switched network to enable measurements of data transmission latency and data transmission loss resulting from the active test to be analysed are communicated in the active test data packets, reducing or removing the need for additional active test result data to be transmitted across the packet switched network.

Preferably, passive data throughput measurement result data is communicated to the active test server in active test data packets. Again, this has the effect of minimising the amount of data traffic across the packet switched network which is required for analysis of the results of the tests.

The packet switched network is typically a telecommunication network which supports packet switched data transmission. The packet switched network is typically a network in which voice calls may be routed to endpoint devices specified by telephone numbers. The packet switched network typically comprises an access network segment and a core network segment.

The packet switched network endpoint devices are typically internet protocol (IP) network endpoint devices, that is to say, computing devices capable of originating IP packets (also known in the art as IP datagrams) and to which IP packets can be ultimately addressed (in contrast to routers). The packet switched data transmission supported by the packet switched network is typically internet protocol data transmission. Thus, the active test data packets are typically IP packets. The passively monitored data throughput is typically the throughput of IP packets, for example, the number of IP packets, or octets, or an amount of data expressed in bits, octets, bytes, kilobytes or other units, received or transmitted in a period of time.

Preferably, the active test data packets are transmitted at the instigation of the endpoint device, for example periodically. The active test server typically transmits active test data packets to the endpoint device responsive to receipt of active test data packet from the endpoint device. Preferably, the endpoint device transmits a first active test data packet to the active test server, the active test server transmits a second active test data packet to the endpoint device responsive to receipt of the first active test data packet and the endpoint device transmits a third active test data packet to the active test server responsive to receipt of the second active test data packet. This enables data transmission latency and loss in both the uplink and the downlink to be measured.

Where the active test data packets are IP packets, the method preferably comprises the step carried out by the endpoint device of receiving an active test data packet (for example, the second active test data packet) from the active test server in a first TCP connection and then, responsive to receipt of the said active test data packet, closing the first TCP connection, opening a second TCP connection and then transmitting an active test data packet (for example, the said third active test data packet) to the active test server using the second TCP connection, wherein the monitored data transmission latency comprises at least one metric dependent on the period of time required for the first TCP connection to be closed and the second TCP connection to be opened (for example, the period of time which elapses between defined events before and after the closing of the first TCP connection and opening of the second TCP connection). Thus, the monitored data transmission latency may include a metric related to the time required for TCP connections to be closed and opened by the endpoint device in use.

Typically, data transmission loss is calculated from the proportion of active test data packets transmitted by the active test server, or more typically by the endpoint device, which are not received by the endpoint device or active test server respectively. Data transmission loss may be calculated from the proportion of active test data packets transmitted by an endpoint device, or by the active test server, which do not result in an active test data packet being received from the active test server by the endpoint device, or from the endpoint device by the active test server, in reply.

Typically, the packet switched network endpoint devices are subscriber devices operable to identify themselves as authorised users of the packet switched network, or a portion thereof, for example, where the packet switched network is a telecommunication network, the packet switched network endpoint devices may be mobile telephones or other mobile stations having radio transceivers and SIM modules for identifying the mobile station to and regulating communication with the telecommunication network. The packet switched network endpoint devices may, for example, be cellular telephones, laptop computers or desktop computers. Preferably, where the packet switched network includes an access network segment, a plurality of, or all of the packed switched network endpoint devices, are owned or leased by customers of the organisation which provides the access network segment. Typically, the method can be conducted while a user of an endpoint device uses the packet switched network to request and receive data downloads through the packet switched network.

Thus, a key advantage of the invention is that it may be implemented using the endpoint devices (e.g. cellular telephones) of customers of an access network segment, while they are carrying out normal activities. This contrasts with end-to-end network testing using only dedicated test appliances. This facilitates the acquisition of relevant data concerning data throughput, and data transmission latency and loss The packet switched network may be an internet protocol network. However, the packet switched network is typically operable to support a plurality of different types of data transmission, including for example both circuit switched and packet switched data transmission. Packets switched data transmission may include relaying packets through circuit switched network components. The core network segment is typically an IP network. The access network segment may be a radio or wireline access network, or employ a combination of radio and wireline technologies. For example, the access network segment may be selected from a group comprising: an xDSL network, a hybrid fibre-coaxial network, a CDMA network, a GSM network, a GPRS network, a GPRS EDGE network, an HSDPA network, a UTRAN network, an LTE network, a WiFi network, a WiMAX network or any other current or future access network technology.

Some or all of the monitored data (some or all of data throughput, data transmission latency and data transmission loss) may concern data transmission through a specific hardware network interface of the endpoint device. The specific hardware network interface may be one of a plurality of hardware network interfaces of the endpoint device.

Data may be monitored concurrently through a plurality of specific hardware network interfaces of the endpoint device. Thus, at least some of the endpoint devices comprise a plurality of hardware network interfaces (for example, a GSM interface, a WiFi interface, a USB interface) and the method may comprise passively monitoring data throughput between the packet switched network and the endpoint device and actively monitoring data transmission latency and data transmission loss independently through a plurality of specific hardware network interfaces of the endpoint device, concurrently or consecutively.

Some or all of the monitored data (some or all of data throughput, data transmission latency and data transmission loss) may concern data transmission through a specific software network interface of the endpoint device. The specific software network interface may be one of a plurality of software network interfaces of the endpoint device. A software network interface (e.g. a TCP/IP driver) may be operable to communicate through a plurality of hardware network interfaces of the endpoint device. Similarly, a plurality of software network interfaces may be operable to communicate through a respective hardware network interface of the endpoint device.

Data may be monitored concurrently in respect of each of plurality of specific software network interfaces of the endpoint device. Thus, at least some of the endpoint devices comprise a plurality of software network interfaces and the method may comprise independently passively monitoring data throughput between the packet switched network and the endpoint device and actively monitoring data transmission latency and loss through a plurality of specific software network interfaces.

Preferably, at least data transmission latency or data transmission loss (and typically both) is actively monitored at application layer on the mobile device. That is to say, the endpoint device comprises at least one software network interface (typically a transmission layer network interface, for example a TCP/IP interface) and is operable to execute applications which communicate with the packet switched network through the software network interfaces. Preferably, the data transmission latency and data transmission loss which is actively monitored is the data transmission latency and data transmission loss experienced by applications executed on the endpoint device. Thus, active test data packets may be transmitted and received using an application layer protocol, which is preferably hypertext transfer protocol (HTTP). Hypertext transfer protocol is defined from time to time by the World Wide Web Consortium and includes HTTP/1.0 and HTTP/1.1. Typically, active test data packets are transmitted and received using a transport layer application programming interface, for example, the Berkely socket interface.

Data throughput may also be monitored on the endpoint device at the application layer. The endpoint device preferably comprises one or more software network interfaces which record the receipt and/or transmission of data packets through the respective software network interface. Data throughput may be monitored by periodically polling the number of received or transmitted data packets recorded by a software network interface.

In order to measure data loss, active test data packets transmitted to the server by the endpoint device may include packet identifiers, which are typically sequential. Active test data packets transmitted to the endpoint device by the active test server may also include packet identifiers, which are typically sequential. The method may comprise determining from the packet identifiers of received active test data packets whether specific active test data packets which were previously transmitted by an endpoint device or the active test server were received by the active test server or the endpoint device respectively, and taking this into account when determining data transmission loss.

The method may comprise measuring the period of time which elapses between one or more pairs of events relating to the transmission of active test data packets, or the receipt of active test data packets. The method may comprise measuring the time (for example, the time indicated by a clock) at which a plurality of events relating to the transmission or receipt of active test data packets occur. Typically some or all of the events relating to the transmission or receipt of activate test data packets are times are application layer read or write times. This ensures that the resulting measured times are indicative of the properties of data transmission experienced by applications.

Where the packet switched network comprises an access network segment and a core network segment, the active test server may be in electronic communication with the packet switched network through the core network segment so that active test data packets transmitted from the endpoint device to the active test server or vice versa are transmitted through both the access network segment and the core network segment. Thus, properties of data transmission through both the access network segment and the core network segment may be measured. However, the active test server may be in electronic communication with the packet network through an interface between the access network segment and the core network segment so that active test data packets transmitted from the endpoint device to the active test server or vice versa are transmitted through the access network segment and not the core network segment, to enable the active monitoring of data transmission latency and data transmission loss through the access network.

A plurality of active test servers may be provided in electronic communication with the packet switched network through interfaces at different locations within the packet switched network to enable the active monitoring of data transmission latency and data transmission loss through a portion of the packet switched network.

The method may further comprise taking measurements at the active test server (as opposed to, or as well as, at the endpoint device) relating to at least one of data transmission latency and data transmission loss. This can reduce the amount of computation required at the endpoint device.

The active test data packets preferably contain data different to data sent during the normal operation of the endpoint device (that is, data packets may be employed that are specific to the testing operation). Or, put another way, there is preferably no modification of data packets relating to data sent during the normal operation of the operation of the endpoint device. This can minimise the risk that the testing operation will affect the normal operation of the endpoint device. In most respects one would not want the packet switched network to discriminate between testing and non-testing data packets but in some cases this could be advantageous, for example if billing is carried out on a per-megabyte (or similar) basis and it is desired not to charge for test data. Accordingly, the active test data packets may include data facilitating identification of the packets as having a test purpose.

The invention extends in a second aspect to a packet switched network endpoint device comprising a communications interface for communicating with a packet switched network, wherein the endpoint device is operable to passively monitor data throughput between a packet switched network and the endpoint device and to conduct an active test by transmitting active test data packets to and receiving active test data packets from the packet switched network to actively monitor data transmission latency and data transmission loss through the packet switched network.

The endpoint device is preferably operable to address the transmitted active test data packets to an active test server. The active test server is typically operable to respond to the receipt of an active test data packet by transmitting a further active test data packet in reply.

Typically, the communications interface is operable to communicate with the access network segment of a packet switched network comprising an access network segment and a core network segment, Further optional features of the network endpoint device correspond to those discussed above in relation to the first aspect of the invention.

In a third aspect of the invention there is provided a system comprising a packet switched network, an active test server and a plurality of packet switched network endpoint devices according to the second aspect of the invention in electronic communication with the packet switched network. It may be that the packet switched network comprises a core network segment and an access network segment and the plurality of packet switched network endpoint devices are in electronic communication with the access network segment.

Further optional features of the system correspond to optional features discussed above in relation to the first and second aspects of the invention.

In a fourth aspect, the invention extends to computer software which, when executed on a packet switched network endpoint device, is operable to cause the packet switched network endpoint device to carry out a method according to the first aspect of the invention or to function as a packet switched network endpoint device according to the second aspect of the invention. The invention also extends to computer software which, when executed on a computer, is operable to cause the computer to function as the active test server of a system according to the third aspect of the invention.

The computer software may be stored on a computer readable medium, for example, a solid state memory device or a magnetic or optical disc. The computer software may be stored in, or on, a carrier. The carrier may be a transmissible carrier, for example an electrical wire, optical fibre, or radio signal.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
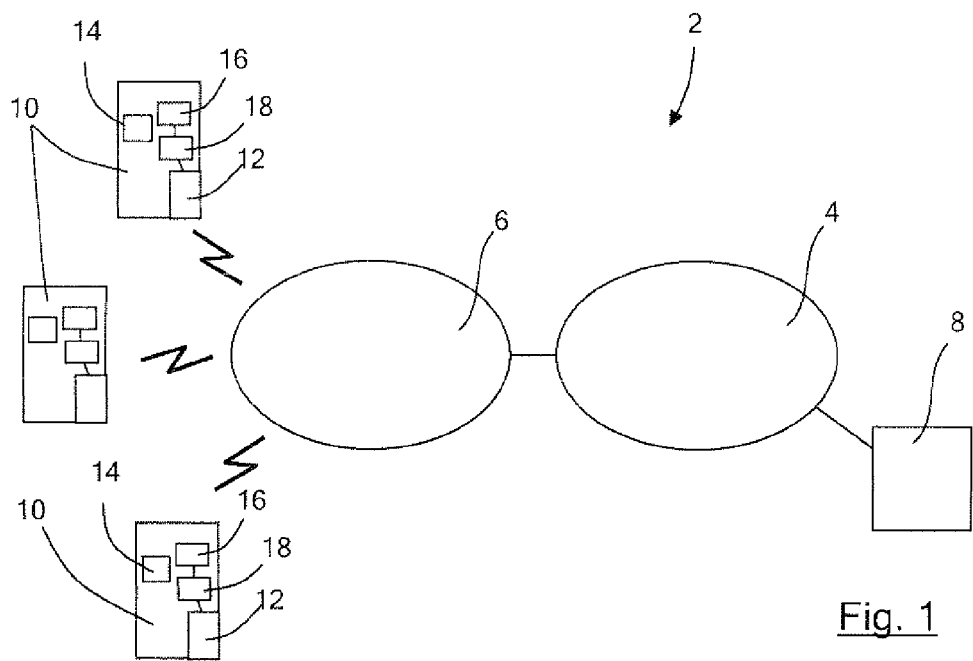
FIG. 1 is a schematic diagram of a telecommunications network in communication with test apparatus according to the invention.

With reference to FIG. 1, a telecommunications system 2 (functioning as the packet switched network) capable of supporting internet protocol (IP) data transmission comprises a core network 4 (functioning as the core network segment) and an access network 6 (functioning as the access network segment). An active test server 8 is in electronic communication with the core network and a plurality of subscriber devices 10 which are capable of originating and receiving data requests, and so functioning as network endpoint devices, are in communication with the access network.

The core network will typically include a plurality of routers which communicate with each other using TCP/IP. Typically, each core network will communicate with a plurality of access networks and the core networks of other telecommunications providers. The access network could be a wireless radio network, for example a network based on CDMA, GSM, GPRS, GPRS EDGE, UTRAN, LTE, WiFi or WiMAX communications protocols. The access network could be a wired network, for example, an xDSL or HFC network.

Each subscriber device has an electronic communication interface 12 (functioning as a hardware network interface) suitable for communicating with the access network. The subscriber devices have microprocessors 14 executing operating system software and software applications 16, as well as TCP/IP interface software and other software network interface modules 18 (functioning as software network interfaces) which regulate communication between applications which are being executed on the subscriber device and the telecommunication network through the electronic communication interface. At least some of the subscriber devices can communicate with a plurality of access networks and have either multifunctional electronic communication interfaces or multiple electronic communication interfaces. Different software network interface modules may be provided for different electronic communications interfaces or different communications protocols using the same electronic communication interface. Suitable subscriber devices include mobile telephones and personal digital assistants used by customers of a telecommunication service provider, or laptop computers, with installed test software.

Test software 20 is executed on at least some of the subscriber devices on a continuous basis, while a user carries out their normal use of the device, for example making and receiving voice calls, sending and receiving messages by email, SMS, MMS or other message formats, downloading web pages and receiving streaming media, as well as carrying out functions which do not require network connectivity, such as accessing locally stored data and running applications which do not access the telecommunications network. Thus, measurements can be taken while a user carries out their everyday activities.

Software network interface modules, such as TCP/IP drivers, typically record data throughput in both the uplink and downlink direction, for example, by storing a simple count of data packets received and transmitted, or the total amount of data received and transmitted expressed in bits, octets, bytes, kilobytes or any other suitable format. The test application periodically queries the software network interface module to request current values of total data sent and received through that network interface. The difference between the received values is stored as an indicator of data throughput. The frequency of polling is selected depending on the time resolution which is required and may, for example, be 1 Hz. The test application may read additional information from the software network interface module, such as the number of error packets, dropped packets, multicast packets or broadcast packets, where the software network interface module logs the required data.

While data throughput is being passively monitored, the test application also conducts periodic active tests. The periodic active tests may be conducted at a different frequency to polling to passively measure throughput. For example, an active test may be conducted every 15 s, or every 30 s. The frequency of active tests (and optionally passively monitoring) may vary over time, for example, it may be higher when communications with a subscriber device are first monitored and later be decreased. The frequency of active tests may vary dependent on activities being carried out by the subscriber device. The frequency of active tests may be increased, or decreased, responsive to passively measured throughput exceeding a predetermined threshold.

In each active test, the test application transmits an HTTP POST message to the active test server, through the telecommunications network. An HTTP POST message involves transmitting an IP datagram. The active test server responds to the HTTP POST message whereupon the test application responds by sending a second HTTP POST message to the active test server, in a separate TCP connection.

Figure 2:
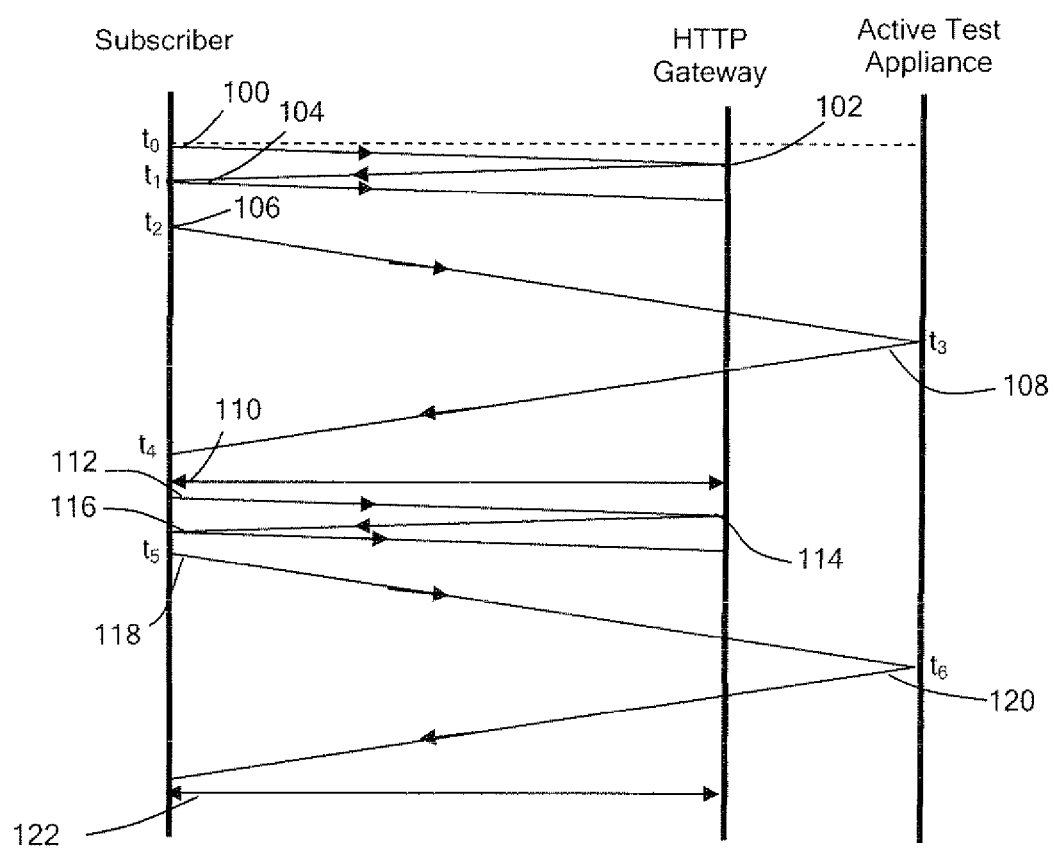
FIG. 2 is a timing diagram of stages during an active test.

This procedure is illustrated in more detail in FIG. 2. A TCP connection is requested 100 by the sending of a SYN (synchronise) packet via an HTTP gateway. This, and subsequent steps illustrated in FIG. 2, are controlled using a TCP/IP application programming interface. The HTTP gateway responds 102 with a SYN-ACK packet. An ACK packet is transmitted 104 back to the HTTP gateway to complete a socket opening handshake although the timing of this packet may well not be taken into account when calculating metrics. One skilled in the art will appreciate that whether or not the HTTP connection is propagated from the HTTP gateway to the active test server before the first HTTP POST message is received will vary between implementations and configurations. Furthermore, the HTTP gateway may be physically integrated with the active test server but is more typically separate to the active test server and may be distributed.

Once a TCP connection has been opened, a first HTTP POST datagram (functioning as the first active test data packet) is transmitted 106 to the active test server, through the HTTP gateway, and the active test server responds by transmitting 108 an IP datagram (functioning as the second active test data packet) in reply, which may simply be a status message ("200 OK"). The socket is then closed 110.

A second TCP connection is then opened by sending a further SYN packet 112 to the HTTP gateway which responds 114 with a SYN-ACK packet. Again, an ACK packet is transmitted 116 back to the HTTP gateway to complete a socket opening handshake. A second HTTP POST datagram is then transmitted 118 to the active test server by the subscriber device, through the HTTP gateway. The active test server replies 120 as before and the second TOP connection is closed 122.

In order to enable the latency of data transmission to be monitored, the time at which specific data packets are transmitted and received by the subscriber device and by the active test server are recorded. In order to obtain latency metrics which accurately reflect the experience of a user of the subscriber device, the measured times are, where relevant, application layer write or read times, which may differ significantly (perhaps by several hundred microseconds) from the times at which datagrams are physically transmitted from or received through electronic interfaces of the subscriber device and active test server. Examples of suitable times are illustrated in FIG. 2.

$t_0$ is a reference time at which the active test procedure begins and a SYN packet is transmitted which is in due course intercepted by an HTTP gateway of the access network. $t_1$ is time of the receipt of the first IP datagram in reply from the HTTP gateway to create a TCP socket. $t_2$ is the time at which a first HTTP POST message is transmitted by the subscriber device. $t_3$ is the time at which the first HTTP POST message is received by the active test server. $t_4$ is the time at which a packet is received in reply by the subscriber device. $t_5$ is the time at which a second HTTP POST message is transmitted by the subscriber device. $t_6$ is the time at which the active test server receives the second HTTP POST message.

$t_0$, $t_1$, $t_2$, $t_4$ and $t_5$ are measured at the subscriber device and $t_3$ and $t_6$ are measured at the active test server. Each of $t_0$ through $t_6$ is measured at the application layer, that is to say when data is written to or read from a TCP/IP application programming interface. Either the clocks at the subscriber device and active test server are synchronised or a time difference between the two is calculated, using known time synchronisation methods.

The values of $t_0$, $t_1$, $t_2$, $t_4$ and $t_5$ for each active test are communicated to the active test server in one of the two HTTP POST messages, for example $t_0$ and $t_1$ may be communicated in the first HTTP POST message and $t_2$, $t_4$ and $t_5$ may be communicated in the second HTTP POST message. The value of $t_5$ can be written into the message which is to be transmitted immediately before it is sent. $t_2$ may be transmitted in the same way in the first HTTP POST message. $t_3$ and $t_6$ are measured by the active test server. In some embodiments it will not be necessary to measure $t_0$ as the active test sequence will start at a predetermined time.

Thus, at the completion of an individual active test, data concerning the timing of events within the active test resides with the active test server. Furthermore, additional data packets beyond those required to conduct the test were not required to communicate the results of the active test.

The resulting test data can be processed to calculate relevant metrics concerning latency. For example, an uplink latency metric may be calculated from $(t_3-t_2)$ and/or $+(t_6-t_5)$. A downlink latency metric may be calculated from $(t_4-t_3)$. In each case a suitable correction should be made for any time difference between the clocks of the subscriber device and the active test server.

One skilled in the art will appreciate that, instead of transmitting the absolute value of the time at which events occurred, equivalent data can be obtained by the transmission of time differences to the active test server, for example the period of time which elapses between $t_0$ and the various specified times. The events which are measured may differ between implementations; for example, only some of $t_0$ through $t_5$ may be measured. The time at which further events occur, for example, the time at which In order to enable data loss to be monitored, data packets transmitted between the subscriber device and the active test server are uniquely (and typically consecutively) numbered, using the IP datagram sequence number field. The test application and the active test server log the receipt of active test packets and the number of each packet. Different numbers are allocated for individual active tests. The resulting log data acquired by the test application is transmitted to the active test server in the active test data packets and the active test server can determine from the transmitted log data the proportion of packets sent from the subscriber device to the active test server and vice versa, which were received, and thereby calculate packet loss metrics indicative of data transmission loss in the uplink and the downlink.

Measured data concerning passive data throughput tests can also be included within the active test data packets, along with additional information, such as an identifier of the subscriber device, and data concerning the current status or capabilities of the subscriber device, applications running on the device, and current network activity of the subscriber device.

The test application is distributed to or with the subscriber devices employed by end users of the telecommunications network, for example, subscribers to a mobile telephone network or a broadband data network. The application is executed in the background while users are making their normal everyday use of the subscriber device. An active test may be conducted periodically, for example every second, at which time throughput metrics are analysed by passive means.

Thus, in contrast to test systems which employ dedicated test appliances, the test results reflect the data throughput, latency and packet loss experienced by actual users of the system. As the volume of data transmission required for the system to function is minimal, individual subscriber devices may be monitored on a continuous basis, enabling the performance of the telecommunications network to be analysed at different times, and in different locations. HTTP is an application layer protocol, and so the metrics which are measured by the method of the invention accurately reflect the properties of the communication experienced by applications running on the individual subscriber devices. Thus, the metrics are especially relevant for the monitoring of the experience which users will have using applications that require connectivity to the telecommunication network.

Each active test and throughput measurement can be related to an individual subscriber device and other properties of the subscriber device, including data transmitted from the subscriber device to the active test server concerning the status of the subscriber device, activities of the subscriber device or application being executed by the subscriber device while the active test and throughput measurement were being conducted. Test data can be related to the measured location of the subscriber device. Test data can be analysed statistically to obtain metrics concerning many subscriber devices. Calculated throughput metrics may include the minimum, mean, and maximum packets, octets or bits per second.

The properties of data transmission between the subscriber device and the active test server depend on the location of the active test server within the telecommunications network and, therefore, the path by which data packets are relayed between the subscriber device and the active test data server. Where the active test server is located so as to communicate with the subscriber device through both the core network and the access network, the resulting latency and loss metrics are representative of data transmission through the core network, the access network and the transport, internet and link layers of the subscriber device.

Figure 3A:
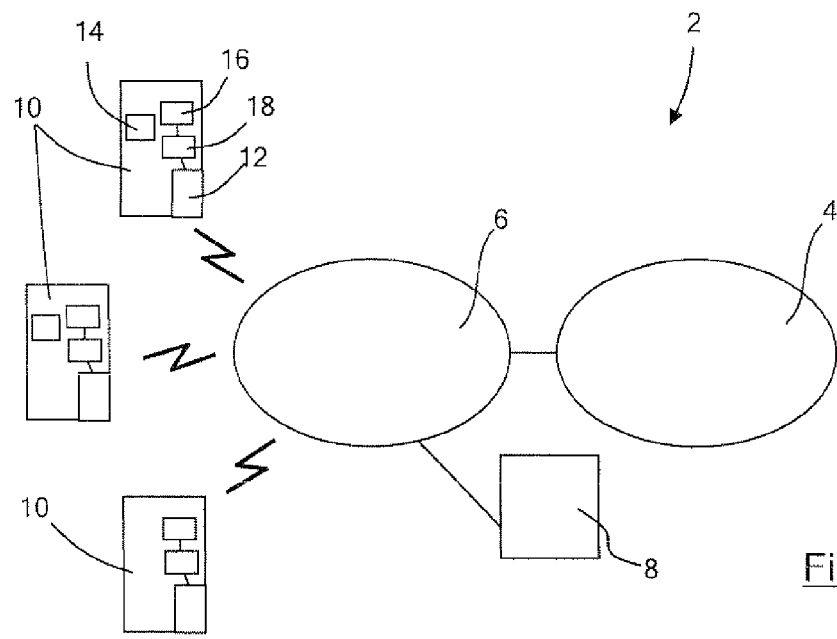
FIG. 3 is a schematic diagram of alternative configurations of the test apparatus.
Figure 3B:
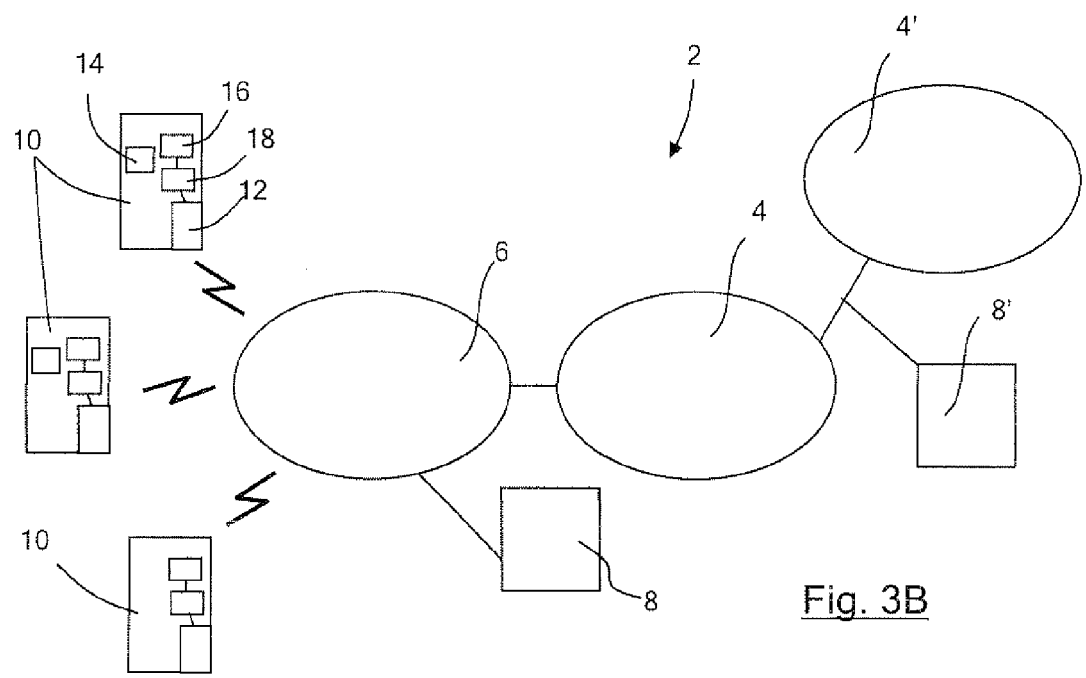

Measurement of latency and loss within the access network, independently of properties of data transmission in the core network can be obtained by connecting the active test server to the telecommunications network directly through the access network (FIG. 3A). More than one active test data server 8, 8' may be provided, interfacing with different locations within the telecommunications network (FIG. 3B) and at the interface between the core network and other core networks 4'. Where the same core network interfaces with a plurality of access networks, active test servers may be provided in communication with respective interfaces between the core network and the individual access networks. Conceivably, a single active test data server may have multiple interfaces to interface at two or more different locations within the telecommunications network, In this case, the test application active tests may be conducted between a subscriber device and a first active test data server and, at the same time or subsequently, between the subscriber device and a second active test data server. Data concerning active tests conducted between the subscriber device and different active test data servers may be used to determine properties of data throughput along different routes through the telecommunications network and thereby establish metrics in connection different parts of the telecommunications network. Thus, the invention is useful to enable the proprietors of individual segments of the telecommunication network, for example, the proprietor of an access network segment, to test, monitor and guarantee metrics of data throughput, latency and loss.

Further variations and modifications may be made within the scope of the invention herein disclosed.

The invention claimed is:

1. A method of measuring properties of data transmission either or both to and from packet switched network endpoint devices through a packet switched network, the method comprising the steps carried out by a packet switched network endpoint device of passively monitoring data throughput between the packet switched network and the endpoint device and conducting an active test, the active test comprising transmitting active test data packets to and receiving active test data packets from the packet switched network to actively monitor data transmission latency and data transmission loss through the packet switched network, wherein the packet switched network is a telecommunication network which supports packet switched data transmission and which comprises an access network segment and a core network segment, and where the packet switched network end point device is a subscriber device.

2. A method according to claim 1, wherein the active test is conducted whilst data throughput is passively monitored.

3. A method according to claim 1, wherein monitoring data throughput comprises receiving at least one measurement of a total data throughput between the packet switched network and the endpoint device.

4. A method according to claim 3, wherein monitoring data throughput further comprises calculating the difference between measurements of the total data throughput between the packet switched network and the endpoint device during a given time period.

5. A method according to claim 1, wherein the active test data packets are transmitted at an instigation of the endpoint device.

6. A method according to claim 1, wherein the packet switched network endpoint devices are internet protocol (IP) network endpoint devices, the packet switched network supports internet protocol data transmission, and the active test packets are IP packets.

7. A method according to claim 1, wherein the method comprises providing an active test server in electronic communication with the packet switched network for receiving active test data packets from and transmitting active test data packets to the endpoint devices.

8. A method according to claim 7, wherein at least some active test result data is calculated by the endpoint device and communicated to the active test server in an active test data packet.

9. A method according to claim 7, wherein passive data throughput measurement result data is communicated to the active test server in active test data packets.

10. A method according to claim 7, wherein the active test server transmits active test data packets to the endpoint device responsive to receipt of active test data packet from the endpoint device.

11. A method according to claim 10, wherein the active test data packets are IP packets, and the method comprises the step carried out by the endpoint device of receiving an active test data packet from the active test server in a first TCP connection and then, responsive to receipt of the said active test data packet, closing the first TCP connection, opening a second TCP connection and then transmitting an active test data packet to the active test server using the second TCP connection, wherein the monitored data transmission latency comprises at least one metric dependent on the period of time required for the first TCP connection to be closed and the second TCP connection to be opened.

12. A method according to claim 7, wherein the active test server is in electronic communication with the telecommunication network through the core network segment so that active test data packets transmitted from the endpoint device to the active test server or vice versa are transmitted through both the access network segment and the core network segment or wherein the active test server is in electronic communication with the telecommunication network through an interface between the access network segment and the core network segment so that active test data packets transmitted from the endpoint device to the active test server or vice versa are transmitted through the access network segment and not the core network segment.

13. A method according to claim 7, further comprising taking measurements at the active test server relating to at least one of data transmission latency and data transmission loss.

14. A method according to claim 1, wherein the packet switched network endpoint devices are subscriber devices operable to identify themselves as authorised users of the packet switched network, or a portion thereof.

15. A method according to claim 14, wherein the endpoint devices are endpoint devices of customers of an access network segment, and the method is conducted while the customers are carrying out normal network activities.

16. A method according to claim 1, wherein some or all of the monitored data concerns data transmission through a specific hardware network interface of the endpoint device or a specific software interface of the endpoint device.

17. A method according to claim 16, wherein data is monitored concurrently in respect of data transmission through each of a plurality of specific software or hardware network interfaces of the endpoint device.

18. A method according to claim 1, wherein at least data transmission latency or data transmission loss is actively monitored at application layer on the endpoint device.

19. A method according to claim 18, wherein active test data packets are transmitted and received using hypertext transfer protocol (HTTP).

20. A method according to claim 1, wherein the active test data packets contain data different to data sent during a normal operation of the endpoint device.

21. A method according to claim 1, comprising measuring a period of time which elapses between one or more pairs of events relating to the transmission of active test data packets, or the receipt of active test data packets.

22. A packet switched network endpoint device comprising a communications interface for communicating with a packet switched network, wherein an endpoint device is operable to passively monitor data throughput between the packet switched network and the endpoint device and to conduct an active test by transmitting active test data packets to and receiving active test data packets from the packet switched network to actively monitor data transmission latency and data transmission loss through the packet switched network, wherein the packet switched network is a telecommunication network which supports packet switched data transmission and which comprises an access network segment and a core network segment, and wherein the packet switched network end point device is a subscriber device.

23. A packet switched network endpoint device according to claim 22, operable to address the transmitted active test data packets to an active test server.

24. A system comprising a packet switched network, an active test server in electronic communication with the packet switched network; and a plurality of packet switched network endpoint devices in electronic communication with the packet switched network, each packet switched network endpoint device comprising a communications interface for communicating with the packet switched network, and being configured to passively monitor data throughput between the packet switched network and the endpoint device and to conduct an active test by transmitting active test data packets to and receiving active test data packets from the packet switched network to actively monitor data transmission latency and data transmission loss through the packet switched network, wherein the packet switched network is a telecommunication network which supports packet switched data transmission and which comprises an access network segment and a core network segment, and wherein the packet switched network end point device is a subscriber device.

25. A system according to claim 24, wherein the endpoint devices are operable to conduct the active test whilst data throughput is passively monitored.

26. A system according to claim 24, wherein the endpoint device is configured to receive at least one measurement of the total data throughput between the packet switched network and the endpoint device.

27. A system according to claim 26, wherein the endpoint device is further configured to calculate the difference between measurements of the total data throughput between the packet switched network and the endpoint device during a given time period.

28. A system according to claim 24, wherein the packet switched network endpoint devices are internet protocol (IP) network endpoint devices, the packet switched network supports internet protocol data transmission, and the active test packets are IP packets.

29. A system according to claim 24, wherein the endpoint device is operable to calculate at least some active test result data and to communicate the said calculated active test result data to the active test server in an active test data packet.

30. A system according to claim 24, wherein the endpoint device is operable to communication passive data throughput measurement result data to the active test server in active test data packets.

31. A system according to claim 24, wherein the active test server is operable to transmit active test data packets to the endpoint device responsive to receipt of active test data packet from the endpoint device.

32. A system according to claim 31, wherein the active test data packets are IP packets, and the endpoint device is operable to receive an active test data packet from the active test server in a first TCP connection and then, responsive to receipt of the said active test data packet, close the first TCP connection, open a second TCP connection and then transmit an active test data packet to the active test server using the second TCP connection, wherein the monitored data transmission latency comprises at least one metric dependent on the period of time required for the first TCP connection to be closed and the second TCP connection to be opened.

33. A system according to claim 24, wherein the active test server is in electronic communication with the telecommunication network through the core network segment or wherein the active test server is in electronic communication with the telecommunication network through an interface between the access network segment and the core network segment so that active test data packets transmitted from the endpoint device to the active test server or vice versa are transmitted through the access network segment and not the core network segment.

34. A system according to claim 24, wherein the active test server is configured to take measurements relating to at least one of data transmission latency and data transmission loss.

35. A system according to claim 24, comprising a plurality of active test servers in electronic communication with different regions of the packet switched network.

36. A system according to claim 24, wherein the endpoint devices are endpoint devices of customers of the access network segment.

37. A system according to claim 24, wherein some or all of the monitored data concerns data transmission through a specific hardware network interface of the endpoint device or a specific software interface of the endpoint device.

38. A system according to claim 24, operable to monitor data concurrently in respect of data transmission through each of a plurality of specific software or hardware network interfaces of the endpoint device.

39. A system according to claim 24, operable to monitor data transmission latency or data transmission loss actively at application layer on the endpoint device.

40. A system according to claim 39, wherein the active test data packets are transmitted and received using hypertext transfer protocol (HTTP).

41. A system according to claim 24, wherein the active test data packets contain data different to data sent during the normal operation of the endpoint device.

42. A non-transitory computer-readable medium storing computer software which, when executed on a packet switched network endpoint device, is operable to cause the packet switched network endpoint device to carry out a method of measuring properties of data transmission either or both to and from packet switched network endpoint devices through a packet switched network, the method comprising the steps carried out by a packet switched network endpoint device of passively monitoring data throughput between the packet switched network and the endpoint device and conducting an active test, the active test comprising transmitting active test data packets to and receiving active test data packets from the packet switched network to actively monitor data transmission latency and data transmission loss through the packet switched network, wherein the packet switched network is a telecommunication network which supports packet switched data transmission and which comprises an access network segment and a core network segment, and wherein the packet switched network end point device is a subscriber device.

43. A non-transitory computer-readable medium storing computer software which, when executed on a computer, is operable to cause the computer to function as the active test server of a system comprising a packet switched network, an active test server in electronic communication with the packet switched network; and a plurality of packet switched network endpoint devices in electronic communication with the packet switched network, each packet switched network endpoint device comprising a communications interface for communicating with a packet switched network, and being configured to passively monitor data throughput between a packet switched network and the endpoint device and to conduct an active test by transmitting active test data packets to and receiving active test data packets from the packet switched network to actively monitor data transmission latency and data transmission loss through the packet switched network, wherein the packet switched network is a telecommunication network which supports packet switched data transmission and which comprises an access network segment and a core network segment, and wherein the packet switched network and point device is a subscriber device.

* * * * *